United States Patent [19]
Lader

[11] 4,000,490
[45] Dec. 28, 1976

[54] TRAVELING RANGE GATE TRACKING SYSTEM

[75] Inventor: Leon J. Lader, Los Angeles, Calif.

[73] Assignee: General Dynamics Corporation, Pomona, Calif.

[22] Filed: Jan. 30, 1975

[21] Appl. No.: 545,687

[52] U.S. Cl. .............................................. 343/7.3
[51] Int. Cl.² .......................................... G01S 9/14
[58] Field of Search .................................... 343/7.3

[56] References Cited
UNITED STATES PATENTS

| 3,121,869 | 2/1964 | Alpers | 343/7.3 |
|---|---|---|---|
| 3,716,858 | 2/1973 | Worthington | 343/7.3 |
| 3,787,846 | 1/1974 | Bishop | 343/7.3 |

*Primary Examiner*—T.H. Tubbesing
*Attorney, Agent, or Firm*—Henry M. Bissell; Edward B. Johnson

[57] ABSTRACT

The specification discloses a variable range gate for time tracking a video echo signal reflected from a target. Range gate correction is effected by the output of a logic circuit which determines the location of the maximum echo signal on a multiple tap delay line.

7 Claims, 10 Drawing Figures

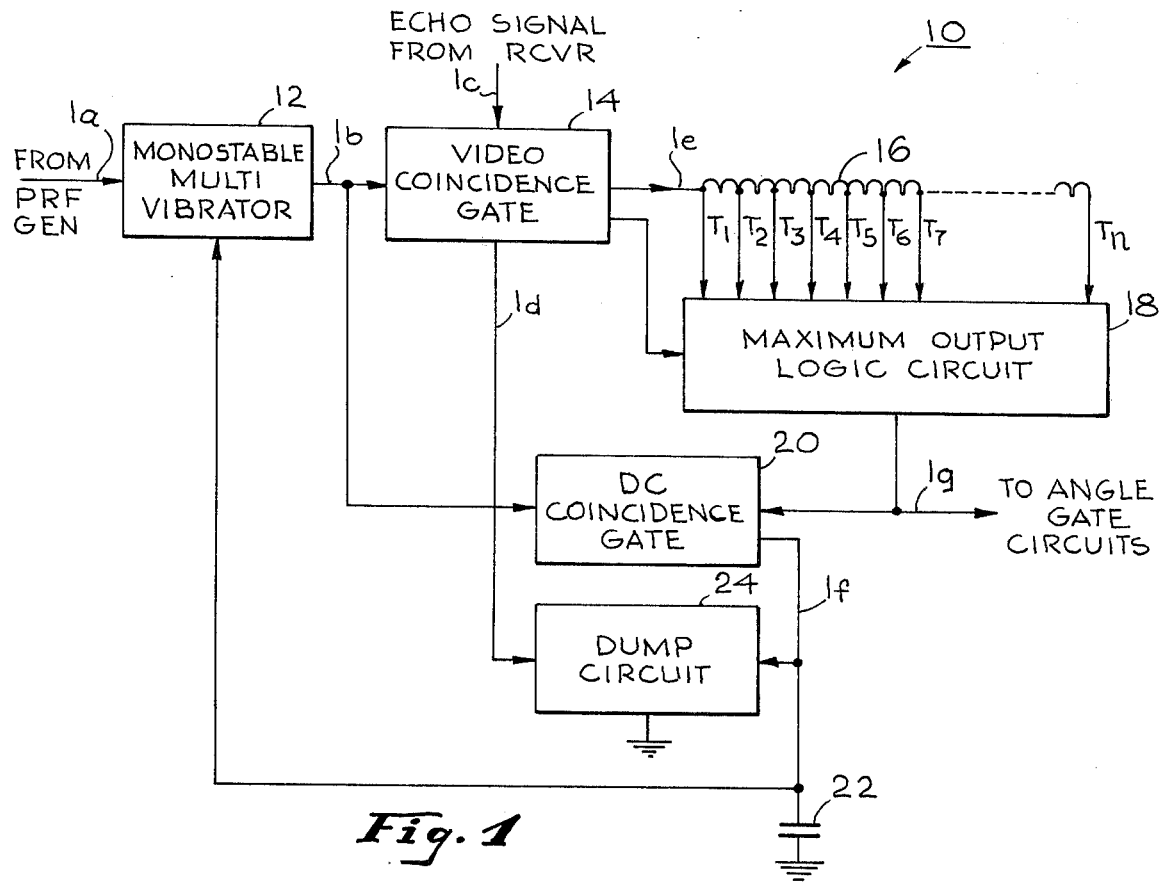
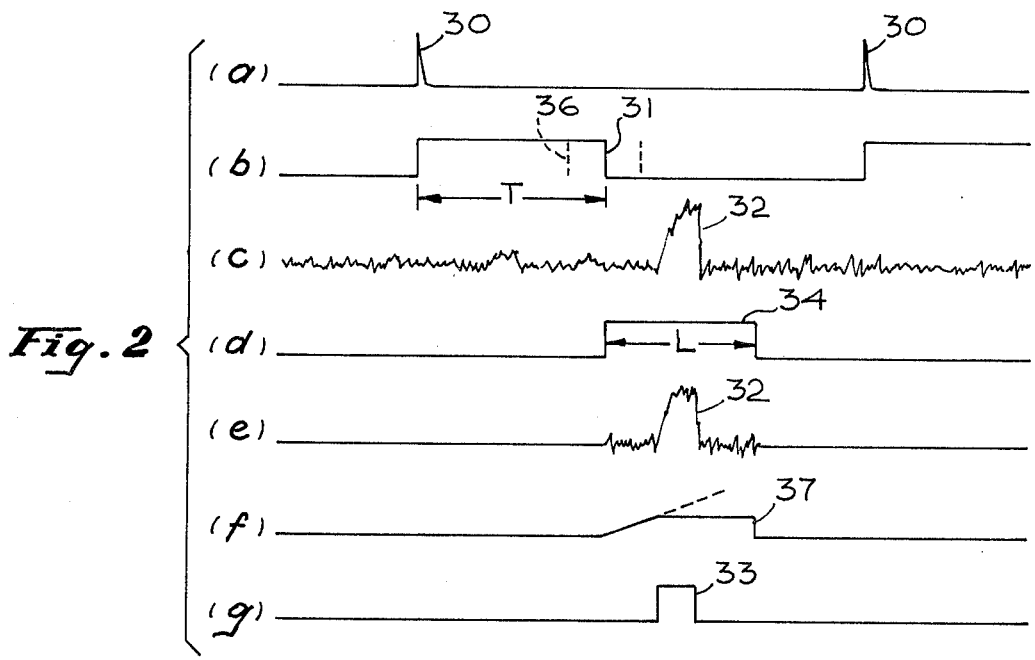

… …

TRAVELING RANGE GATE TRACKING SYSTEM

BACKGROUND OF THE INVENTION

1. Field of the Invention.

This invention relates to radar systems and, more particularly, to such systems including circuitry for automatically following a selected target.

2. Description of the Prior Art.

Tracking range gates are utilized in radar systems to follow in time coincidence an echo signal reflected from a target. This gating function serves to enhance signal-to-noise ratio and reduce angular tracking error by excluding unwanted targets, noise and other interference which fall outside the time window within which a return pulse from the desired target is anticipated. Although several techniques for automatically tracking the return video signal have been proposed, most of these approaches are costly and complex from the standpoint of the circuits involved. Reference is made to the following prior art systems: U.S. Pat. No. 3,566,405 entitled "Frequency Controlled Range Gate" of L. C. Parode et al; U.S. Pat. No. 3,383,681 entitled "Digital Range Unit" of K. O. Bryant; U.S. Pat. 3,035,263 entitled "Digital Range Tracking Circuit" of L. J. Lader et al; and Canadian Pat. No. 725,810 entitled "Automatic Gating Circuit" of S. P. Applebaum et al.

In addition to its simplicity and reliability, the present invention has a number of other advantages over the prior art. It does not require ramp generators, temperature compensated oscillators, or other precision circuits to effect tracking. Direct range readout is not necessary to initially establish the time position of the gate signal. It will inherently discriminate between targets on the basis of size.

Accordingly, a primary object of the present invention is to provide a simple and reliable traveling range gate circuit capable of automatically locating the return echo and traveling with it as the range of the target varies.

SUMMARY OF THE INVENTION

In brief, the present invention comprises a radar range gate circuit which automatically tracks the echo return signal from a moving target. The information for varying the time position of the gating pulse is derived from a delay line having a plurality of taps by which the relative strength profile of the echo is determined. These taps may be variably spaced in accordance with a selected function, such as the radar range or some other variable. In one embodiment, the opening of the range gate window is controlled by the period of a monostable multivibrator (one-shot) which is triggered "on" when the radar pulse is transmitted. When the one-shot returns to its original (permanently stable) state, it opens the range gate (herein termed the video coincidence gate) and applies the echo return signal to the input of the delay line. The lengthening or shortening of the quasi-stable period of the one-shot is varied in accordance with the potential on a charged capacitor. The charging of the capacitor is initiated via a d.c. coincidence gate when the one-shot returns to the permanently stable state and is interrupted when a signal is received from a logic circuit indicating the presence of the target pulse at a particular tap on the delay line. The magnitude of the voltage on the capacitor thus serves to lengthen or shorten the period of the one-shot, thereby delaying or accelerating the opening of the video coincidence gate. When the video coincidence gate closes, the capacitor is discharged via a dump circuit, thus returning all elements to their original state in readiness for the next transmission pulse.

In an alternative embodiment, each tap of the delay line is connected to an integrating threshold gate which, when actuated by a signal of sufficient magnitude, functions to "lock out" all other non-adjacent gates. As the target range varies, the position of the maximum echo signal relative to the range gate on the delay line moves to operate different gates. When the echo signal progresses to a point where it occurs at a time when the range gate is near the end of the delay line, a shift-range instruction is generated by the "near-range" or "far-range" gate at the extremity taps of the delay line. The shift-range instruction increases or decreases the start time of the range gate by a fixed amount to effect incremental tracking of the echo return.

BRIEF DESCRIPTION OF THE DRAWING

A better understanding of the present invention may be gained by referring to the following detailed description taken in conjunction with the accompanying drawings, in which:

FIG. 1 is a block diagram of the operative elements of a preferred embodiment of a continuous traveling range gate tracking system in accordance with the invention;

FIG. 2 is a series of waveforms associated with the various blocks of FIG. 1 as follows:

FIG. 2a shows the pulses on line 1a as input to the monostable multivibrator;

FIG. 2b shows the output of the monostable multivibrator on line 1b;

FIG. 2c shows a typical video return signal on line 1c;

FIG. 2d shows the video coincidence gate signal on line 1d;

FIG. 2e shows the gated video output on line 1e;

FIG. 2f shows the timing-capacitor potential on line 1f;

FIG. 2g shows the maximum output logic pulse on line 1g;

DESCRIPTION OF THE PREFERRED EMBODIMENTS

Figure 3:
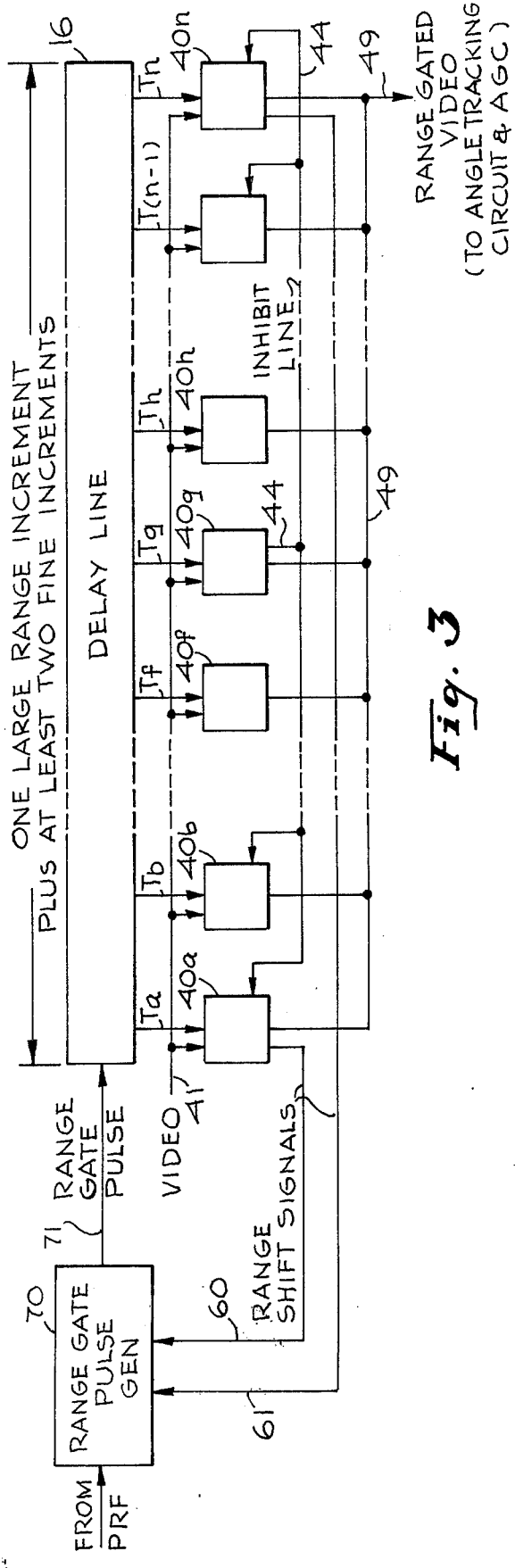
FIG. 3 is a block diagram of an alternative tracking system in accordance with the invention utilizing a series of integrating threshold gates for incrementally tracking an echo return signal.

Referring to the drawings, and particularly FIGS. 1 and 2, there is shown a block diagram of a first preferred embodiment 10 of the invention together with the waveforms associated with each operative element of the system. The system 10 includes a monostable multivibrator 12 coupled to receive input triggering impulses from the pulse repetition frequency generator of an associated radar system and a video coincidence gate 14 coupled to received the echo signal from the receiver of the radar system. The output of the monostable multivibrator 12 is connected to an input of the video coincidence gate 14. The signal output of the video coincidence gate 14 is directed to the input of a delay line 16, having taps $T_1, T_2, \ldots T_n$. These taps $T_1-T_n$ are connected to a maximum output logic circuit 18 having the capability of providing a single output pulse in time relationship to the maximum amplitude signal in the delay line 16. The output of the maximum output logic circuit 18 is directed to a DC coincidence gate 20 and also constitutes the output of the system 10 which is used with associated angle gate circuitry (not shown).

The monostable multivibrator 12 contains a variable bias circuit controlled by the voltage of an associated capacitor 22 which is charged through the DC coincidence gate 20 and discharged through a dump circuit 24 which is controlled by the gate signal of the video coincidence gate 14.

In operation, pulses 30 (FIG. 2a) from the radar pulse repetition frequency generator on line 1a trigger the monostable multivibrator (one-shot 12 to the quasi-stable state. The output (line 1b) is a pulse (FIG. 2b) having a time duration "T" which corresponds to the anticipated range of the target, i.e., $$R = cT/2$$

Where
R is the anticipated range
c is the velocity of propagation

When the one-shot 12 returns to its initial state (indicated by numeral 31 in FIG. 2b;) it triggers the video and DC coincidence gates 14 and 20 respectively. The opening of the DC coincidence gate 20 allows the charge on timing capacitor 22 to increase linearly (see the initial slope of the waveform of FIG. 2f). The opening of the video coincidence gate 14 communicates the amplified signal information on line 1c to the multiple tap delay line 16. The video coincidence gate is designed to have a duration "L" (waveform 34 of FIG. 2d) which is sufficient to accomodate the target pulse 32 (FIG. 2c) plus any uncertainty in target range equal to the delay line length as a maximum. Thus, if the delay line 16n equally-spaced taps, the total duration "L" of the sampling window (FIGS. 2d and 2e) is $n\tau$, where $\tau$ is the time interval between a pair of adjacent delay line taps. Preferably the delay time $\tau$ between adjacent taps should not exceed twice the width of the target pulse in order to minimize system noise.

tion is to provide a range gate which brackets the return pulse from the target being tracked. The range gate waveform 34 is fixed in duration. However, its position in time relative to the pulse 30 from the rader pulse generator is determined by the duration of the on state of the monostable multivibrator 12. As the target being tracked moves toward or away from (in relative motion) the associated radar, the position of the return pulse 32 will deviate from the center position within the range gate 34. The system 10 operates to vary the on state of the monostable multivibrator 12 in accordance with the position of the immediately-preceding echo pulse 32 within the range gate 34 to return the echo pulse 32 to the desired central position.

As the video information progresses down the delay line 16, there will be one tap at which an integrated level exceeding a predetermined threshold is reached first. This threshold is automatically set by integration of circuit noise and ground clutter. Thus, the tap at which the threshold is exceeded by the signal is a maximum, compared with all the others which contain only noise and clutter. A competitive signal arriving later at another tap is inhibited. Whenever the threshold is exceeded at a particular tap of the delay line 16, the maximum output logic circuit 18 generates a pulse 33 (FIG. 2g) on line 1g indicating the presence of a target echo 32 at the delay line 16. The maximum output logic circuit pulse 33 closes the DC coincidence gate 20 to interrupt the charging of timing capacitor 22 as indicated by the change from positive to zero slope in the waveform of FIG. 2f. The time duration "T" of the quasi-stable state of one-shot 12 is functionally dependent upon the potential on timing capacitor 22. Hence, if the maximum output logic pulse 33 is generated at any early time, the average voltage on timing capacitor 22 will be reduced so as to decrease the period "T" of one-shot 12 (as indicated by the dotted line 36 in FIG. 2b), thus opening the video coincidence gate 14 at an earlier time for the next received signal. The system thus self-corrects the time position of the sampling window so as to maintain the target pulse within the limits of the delay line and to tend to center the return pulse within the range gate. When the video coincidence gate 14 closes, dump circuit 24 is actuated to discharge capacitor 22 (as indicated by the numeral 37 in FIG. 2f), thus returning all elements to their initial state in readiness for the next PRF pulse 30 on line 1a.

As the range of the target changes, the time position of the range gate (video coincidence gate) is continually updated to bracket the target echo. If, however, there is no target within the range gate (i.e., the signal in the delay line 16 never exceeds a predetermined threshold), the period "T" of one-shot 12 goes to a maximum or a minimum, depending upon whether the range search is required to proceed inward or outward.

The details of the individual elements have not been included as they are all well known in the prior art. The monostable multivibrator 12 is a conventional voltage controlled one-shot. The timing circuitry for the "ON" period of the video coincidence gate may also comprise a one-shot. The maximum output logic circuit is preferably a diode/capacitor charging circuit at each tap which is continually sampled by a high impedance buffer. The buffer may be connected to a threshold circuit which permits no output until one potential exceeds a predetermined value which is greater than the potential on all the other capacitors.

Figure 4:
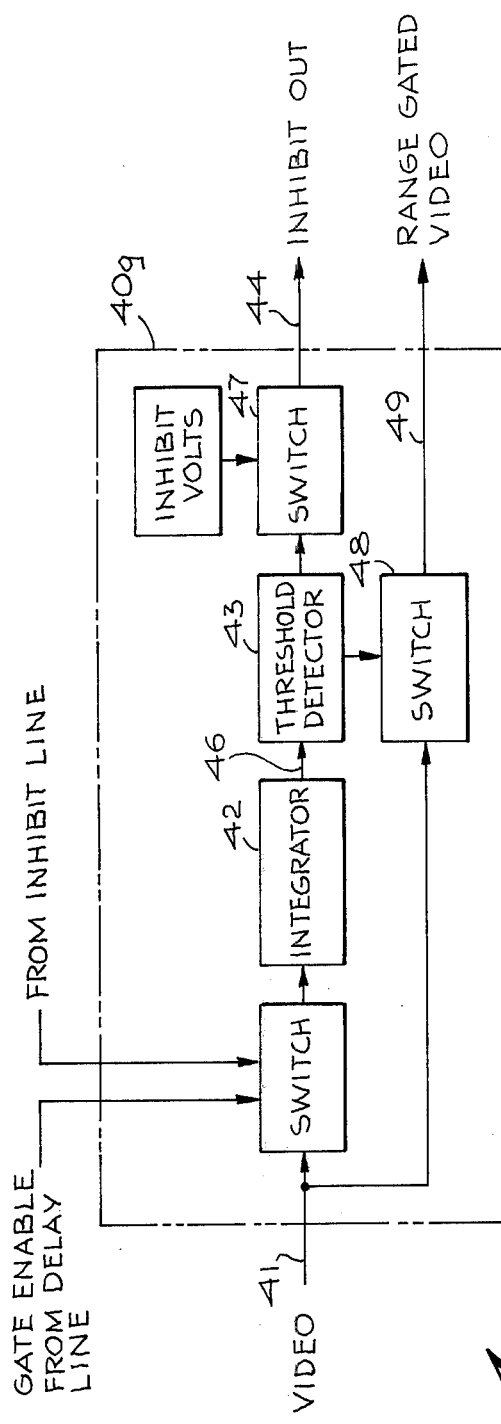
FIG. 4 is a block diagram of a typical integrating threshold gate of FIG. 3.

FIG. 3 shows an alternative embodiment for shifting the range gate to effect tracking. In this embodiment each tap ($T_a{}^i - T_n$) of the delay line is connected to a corresponding input of a separate integrator gate (IG) $40_a - 40_n$, herein termed "range bins". FIG. 4 shows further details of a single integrator gate. The other input of each integrator gate is connected to the video output of the receiver (line 41). The range gate pulse (shown as derived from a range gate generator 70, instead of the video signal) is applied to the delay line 16. If the echo return signal is of sufficient duration, it may reside in more than one range bin (possibly three). Consequently, the integrator gates ($40_a - 40_n$) are interconnected so that any enabled gate will inhibit all non-adjacent gates. To illustrate, assume that the range gate pulse on the delay line 16 arrives at a particular integrator gate $40_g$ when the time integral of the video signal (the output 46 of integrator 42) exceeds a predetermined value (threshold detector 43). The output of threshold detector 43 actuates two switches 47 and 48. Switch 47 generates an inhibit signal on output line 44 which functions to lock out all other integrator gates except the adjacent gates $40_f$ and $40_h$. Although only the inhibit line 44 associated with $40_g$ is shown in FIG.

3, it will be understood that the drawing is indicative of the function only and that in actuality each integrator gate $40_a$–$40_n$ is logically connected to every other integrator gate so as to inhibit all but the adjacent gates. Thus, for moderate signals the video actuates a single integrator gate, the output of which is applied by switch 48 to the range gated video line 49. For larger signals, one or both of the adjacent gates may be actuated.

As the target range varies, the signal progressively moves from one range bin to another, always with the adjacent gates functioning and the more remote gates locked out. When the echo occurs at a time such that the near range or far range integrator gate ($40_a$ or $40_n$) is actuated, a range shift instruction is generated (line 60 or 61). The range shift instruction causes the range gate pulse generator 70 to decrease of increase the start time of the range gate pulse (line 71). As a consequence, the range gate pulse is shifted a fixed increment, rather than continuously as in the first embodiment previously described.

Commercially available monostable multivibrators of flat pack or dual in-line pack types SN54121 and SN74121 may be used in the range gate pulse generator 70 and possess the capability of variable pulse width control by suitable circuit interconnection.

While the basic objective of the second embodiment is concerned with range gate tracking, the system has several inherent advantages over the prior art. For example, it continuously locks out and inhibits all remote gates to prevent tracking more than one target. It integrates the video signal and passes it to the AGC and angle gate tracker circuit (for ultimate display on a plan position indicator or other visual output device or to actuate control surfaces of a homing missile). In addition, the number of range bins which the signal occupies is indicative of the strength of the echo.

Although two basic embodiments have been illustrated, it will be evident that neither embodiment is restricted to a particular circuit or apparatus. Neither are the teachings of the invention limited to radar systems. The basic concepts are also applicable, for example, to sonar and other echo ranging apparatus which depend upon the transmission and reflection of energy. Thus, although a preferred use and preferred embodiments have been shown and described, it will be understood that the invention is not limited thereto, and that numerous changes, modifications, and substitutions may be made without departing from the spirit and scope of the invention, as defined in the appended claims.

What is claimed is:
1. Range gate tracking apparatus for a pulse-echo system comprising:
 a. gating means for generating a signal sampling window having a duration sufficient to bracket a target echo;
 b. control circuitry for varying the gating means so as to cause the sample window to track the echo signal as the target range varies, said control circuitry including:
  1. a delay line having a plurality of taps for receiving echo signals in a signal sampling window;
  2. means connecting the delay line with the gating means for actuating the delay line simultaneously with the generation of the signal sampling window;
  3. means responsively connected to the delay line taps for determining the time position of delay line information and including maximum output logic circuit means for generating an output pulse when the output of a selected tap exceeds the output of all other taps; and
  4. time comparison means responsively coupled to receive the generated output pulse for indicating the time position of a target relative to the sampling window generated by the gating means; and
 c. timing means including a monostable multivibrator having a voltage-responsive duration control input and an output operatively coupled to the gating means for varying the time of initiation of the next signal sampling window relative to a reference signal.
2. The apparatus recited in claim 1 wherein the timing means further includes:
 a capacitor operatively connected to the duration control input of the monostable multivibrator;
 said time comparison means being connected to said capacitor for linearly charging said capacitor; and
 means connecting the time comparison means to the gating means for actuating said time comparison means when the sampling window is initiated, the time comparison means being operative to terminate further charging of the capacitor on receipt of a pulse generated by said maximum output logic circuit means, whereby the average voltage on said capacitor is dependent upon the time difference between the initiation of the sample window and the occurrence of the maximum output logic pulse.
3. The apparatus recited in claim 1 wherein the means connected to the delay line taps comprises:
 gate integrating means responsively connected to each of said delay line taps for integrating the echo signal which occurs during the time period of the sample window;
 switching means responsive to each of the gate integrating means for gating the echo information to an output device whenever the integrated signal exceeds a predetermined threshold; and
 range gate shifting means operatively communicating with the gate integrating means responsive to the extremity taps of said delay line for generating a range gate shift signal when the echo from a target approaches the limits of the sample window.
4. The apparatus recited in claim 3 wherein each of said gate integrating means includes:
 switching means for inhibiting all non-adjacent integrating gate means whenever the integrated signal exceeds a predetermined threshold.
5. In a system for receiving an echo from a transmitted pulse, a range gate tracking apparatus comprising:
 a. a delay line having a plurality of selectively spaced taps;
 b. sensing means responsive to each of the delay line taps for determining the time position of delay line received echo information and including a plurality of integrator gates, each having an enable input responsively connected to the delay line and a second input responsively connected to the received echo signal;
 c. a range gate circuit operatively coupled to actuate the delay line, said range gate circuit generating a signal sample window of duration sufficient to bracket the echo signal;
 d. means for switching the received echo signal to a common output line whenever the time integral of the echo signal at an enabled integrator gate exceeds a predetermined threshold value; and e. traching means responsively coupled to the sensing means for varying the time at which the range gate circuit is actuated.

6. The apparatus recited in claim 5 wherein each of said integrator gates includes:

means for inhibiting all non-adjacent gates whenever the time integral of the signal at an enabled gate exceeds a predetermined threshold.

7. The apparatus recited in claim 5 wherein the delay line taps are variably spaced in accordance with the radar range selected by the apparatus.

* * * * *